US011812272B1

(12) United States Patent
Roundy et al.

(10) Patent No.: US 11,812,272 B1
(45) Date of Patent: Nov. 7, 2023

(54) SYSTEMS AND METHODS FOR UTILIZING USER IDENTITY NOTIFICATIONS TO PROTECT AGAINST POTENTIAL PRIVACY ATTACKS ON MOBILE DEVICES

(71) Applicant: GEN DIGITAL INC., Tempe, AZ (US)

(72) Inventors: Kevin Roundy, El Segundo, CA (US); Acar Tamersoy, Culver City, CA (US); Yufei Han, Antibes (FR); Anil Sharma, Pune (IN); Arif Shaikh, Pune (IN)

(73) Assignee: GEN DIGITAL INC., Tempe, AZ (US)

(*) Notice: Subject to any disclaimer, the term of this patent is extended or adjusted under 35 U.S.C. 154(b) by 172 days.

(21) Appl. No.: 17/206,299

(22) Filed: Mar. 19, 2021

(51) Int. Cl.
*H04W 12/30* (2021.01)
*G06F 21/55* (2013.01)
*G06F 21/31* (2013.01)
*H04W 12/122* (2021.01)

(52) U.S. Cl.
CPC ............ *H04W 12/30* (2021.01); *G06F 21/31* (2013.01); *G06F 21/554* (2013.01); *H04W 12/122* (2021.01); *G06F 2221/034* (2013.01)

(58) Field of Classification Search
CPC ..... H04W 12/30; H04W 12/122; G06F 21/31; G06F 21/554; G06F 2221/034
USPC .......................................................... 726/23
See application file for complete search history.

(56) References Cited

U.S. PATENT DOCUMENTS

| | | | |
|---|---|---|---|
| 9,386,027 B2 * | 7/2016 | Xing | H04W 12/128 |
| 10,673,888 B1 * | 6/2020 | Dudhe | H04L 63/0861 |
| 2015/0106614 A1 * | 4/2015 | Lee | G06F 21/6263 713/150 |
| 2015/0121522 A1 * | 4/2015 | Guido | H04W 12/128 726/23 |
| 2016/0094529 A1 * | 3/2016 | Mityagin | H04L 63/08 726/23 |
| 2016/0232349 A1 * | 8/2016 | Baeder | G06F 21/554 |
| 2017/0289181 A1 * | 10/2017 | Wang | G06F 21/50 |
| 2020/0045062 A1 * | 2/2020 | Cambridge | G08B 7/06 |

(Continued)

OTHER PUBLICATIONS

Wikipedia, "Typosquatting", URL: https://en.wikipedia.org/wiki/Typosquatting, Apr. 14, 2021, 5 pages.

(Continued)

*Primary Examiner* — Saleh Najjar
*Assistant Examiner* — Peiliang Pan
(74) *Attorney, Agent, or Firm* — Greenberg Traurig, LLP (57) ABSTRACT

The disclosed computer-implemented method for utilizing user identity notifications to protect against potential privacy attacks on mobile devices may include (i) monitoring a mobile computing device to detect one or more user interactions by a current user, (ii) identifying the current user of the mobile computing device, (iii) determining that the current user is a potentially malicious user associated with one or more privacy-invasive applications installed on the mobile computing device, and (iv) performing a security action that protects a benign user of the mobile computing device against an attack initiated by the potentially malicious user associated with the privacy-invasive applications. Various other methods, systems, and computer-readable media are also disclosed.

18 Claims, 7 Drawing Sheets

(56) References Cited

U.S. PATENT DOCUMENTS

| | | | | |
|---|---|---|---|---|
| 2021/0200853 | A1* | 7/2021 | Lagnado | G06F 21/35 |
| 2021/0234860 | A1* | 7/2021 | Bansal | H04W 12/37 |
| 2022/0070183 | A1* | 3/2022 | Goyal | H04L 63/0236 |
| 2022/0075867 | A1* | 3/2022 | Gagne-Keats | G06F 21/32 |
| 2022/0167118 | A1* | 5/2022 | Smith | H04W 4/80 |
| 2022/0417748 | A1* | 12/2022 | Wagner | H04W 12/069 |

OTHER PUBLICATIONS

Markmonitor, "Domain Management—Building an online presence that serves customers-not imposters", URL: https://clarivate.com/markmonitor/campaigns/building-an-online-presence-that-serves-consumers/, as accessed on May 7, 2021, 13 pages.

"Certo Mobile Security: Anti Spyware & Spy Detector", URL: https://play.google.com/store/apps/details?id=com.certo.android, Certo Software, Oct. 23, 2020, 4 pages.

"Intruder Selfie", URL: https://play.google.com/store/apps/details?id=org.twinone.intruderselfie&hl=en_US&gl=US, Twinone, Nov. 18, 2017, 3 pages.

* cited by examiner

SYSTEMS AND METHODS FOR UTILIZING USER IDENTITY NOTIFICATIONS TO PROTECT AGAINST POTENTIAL PRIVACY ATTACKS ON MOBILE DEVICES

BACKGROUND

Many applications utilized on mobile computing devices for legitimate purposes may also compromise user privacy when accessed by malicious parties to invade a user's privacy. For example, mobile backup applications may save private user data (e.g., text messages) to a cloud backup storage that may be accessed by malicious users. As another example, many mobile applications offer built-in "family sharing" functionality for reporting user device behavior to others. Additionally, mobile device anti-theft applications are often utilized for continual location tracking leaving users vulnerable to being surveilled by others when there is no suspicion of theft. Additionally, automatic call recording and call logging applications may be utilized for conducting spying activities. Additionally, many legitimate surveillance applications (e.g., parental control applications and child-safety applications) as well as other applications (e.g., map applications, mobile browser applications, etc.) may be utilized in a privacy-invasive manner to monitor a mobile device's location as well as observe a user's browsing history.

Conventional security software may often offer functionality that generates notifications of harmful or privacy-invasive applications on a periodic basis to a mobile device user. However, the notifications generated by conventional security software do not distinguish between users who are recipients of these notifications and thus may often inadvertently alert an attacker who may currently be in possession of a mobile device upon which a privacy-invasive event has occurred instead of intended benign users.

SUMMARY

As will be described in greater detail below, the present disclosure describes various systems and methods for utilizing user identity notifications to protect against potential privacy attacks on mobile devices.

In one example, a method for utilizing user identity notifications to protect against potential privacy attacks on mobile devices may include (i) monitoring a mobile computing device to detect one or more user interactions by a current user, (ii) identifying the current user of the mobile computing device, (iii) determining that the current user is a potentially malicious user associated with one or more privacy-invasive applications installed on the mobile computing device, and (iv) performing a security action that protects a benign user the mobile computing device against an attack initiated by the potentially malicious user associated with the privacy-invasive applications.

In some embodiments, the mobile computing device may be monitored at periodic intervals to detect the user interactions by the current user. Additionally or alternatively, the mobile computing device may be monitored to detect each time the current user authenticates his or her identity for interacting with the mobile computing device. Additionally or alternatively, the mobile computing device may be monitored to detect an application installation action by the current user.

In some examples, the current user of the mobile computing device may be identified by (i) capturing and applying a facial recognition algorithm to a self-portrait image (e.g., a "selfie") of the current user, (ii) detecting a biometric pattern associated with the current user, or (iii) detecting a passcode associated with the current user. In some embodiments, the current user may be determined to be a potentially malicious user associated with privacy-invasive applications installed on the mobile computing device by monitoring a usage of the mobile computing device to detect an installation of a surveillance application on the mobile computing device (e.g., stalkerware, etc.) or a utilization of a previously installed application having configurable privacy invasive features (e.g., location tracking, user browser history, etc.) on the mobile computing device.

In some examples, the security action may include generating a notification that includes an identification of the potentially malicious user and the privacy-invasive applications installed on the mobile computing device for delivery to the benign user (e.g., the mobile device owner or other non-malicious user). In some embodiments, the notification may be generated by (i) detecting one or more additional mobile computing devices associated with the potentially malicious user, (ii) determining a likelihood of the additional mobile computing devices being located near the mobile computing device when the potentially malicious user is utilizing the mobile computing device, and (iii) generating the notification when there is a low likelihood that the additional mobile computing devices are located near the mobile computing device. In some examples, the generated notification may also include information describing a surveillance category associated with the privacy-invasive applications. Additionally or alternatively, the generated notification may include device configuration instructions for the mobile computing device to protect against additional attacks initiated by the potentially malicious user of the privacy-invasive applications.

In one embodiment, a system for utilizing user identity notifications to protect against potential privacy attacks on mobile devices may include at least one physical processor and physical memory that includes computer-executable instructions and a set of modules that, when executed by the physical processor, cause the physical processor to (i) monitor, by a monitoring module, a mobile computing device to detect one or more user interactions by a current user, (ii) identify, by an identification module, the current user of the mobile computing device, (iii) determine, by a determining module, that the current user is a potentially malicious user associated with one or more privacy-invasive applications installed on the mobile computing device, and (iv) perform, by a security module, a security action that protects a benign user of the mobile computing device against an attack initiated by the potentially malicious user associated with the privacy-invasive applications.

In some examples, the above-described method may be encoded as computer-readable instructions on a non-transitory computer-readable medium. For example, a computer-readable medium may include one or more computer-executable instructions that, when executed by at least one processor of a mobile computing device, may cause the mobile computing device to (i) monitor the mobile computing device to detect one or more user interactions by a current user, (ii) identify the current user of the mobile computing device, (iii) determine that the current user is a potentially malicious user associated with one or more privacy-invasive applications installed on the mobile computing device, and (iv) perform a security action that protects a benign user of the mobile computing device against an attack initiated by the potentially malicious user associated with the privacy-invasive applications.

Features from any of the embodiments described herein may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of example embodiments and are a part of the specification. Together with the following description, these drawings demonstrate and explain various principles of the present disclosure.

Throughout the drawings, identical reference characters and descriptions indicate similar, but not necessarily identical, elements. While the example embodiments described herein are susceptible to various modifications and alternative forms, specific embodiments have been shown by way of example in the drawings and will be described in detail herein. However, the example embodiments described herein are not intended to be limited to the particular forms disclosed. Rather, the present disclosure covers all modifications, equivalents, and alternatives falling within the scope of the appended claims.

DETAILED DESCRIPTION OF EXAMPLE EMBODIMENTS

The present disclosure is generally directed to systems and methods for utilizing user identity notifications to protect against potential privacy attacks on mobile devices. As will be described in greater detail below, the systems and methods described herein may utilize various detection features (e.g., the capture of self-portrait images or "selfies," biometric patterns, etc.) of a mobile device to identify potentially malicious users of privacy-invasive applications (e.g., surveillance applications using location tracking with access to a device's browsing history, "stalkerware," etc.) and further monitor the usage of these applications. By utilizing mobile device detection features in this way, the systems and methods described herein may protect the privacy of benign mobile device users (e.g., a mobile device owner or other primary mobile device user) who may intentionally or unintentionally share their mobile devices with third parties, by generating and delivering notifications to these users that include the identity of a potential malicious user utilizing and/or installing privacy-invasive applications as well as providing a description of the type of surveillance conducted through these applications. Thus, the systems and method described herein provide an advantage over existing notification mechanisms for privacy invasive applications utilized by conventional security software, which are often limited to only delivering notifications of these applications on a periodic basis without identifying a potentially malicious user. In addition, the systems and methods described herein may improve the field of computing device security by identifying potentially malicious parties utilizing mobile computing devices to surveil benign mobile device users through the use of privacy-invasive applications on their devices, and further, notifying these benign users of these privacy intrusions.

Figure 1:
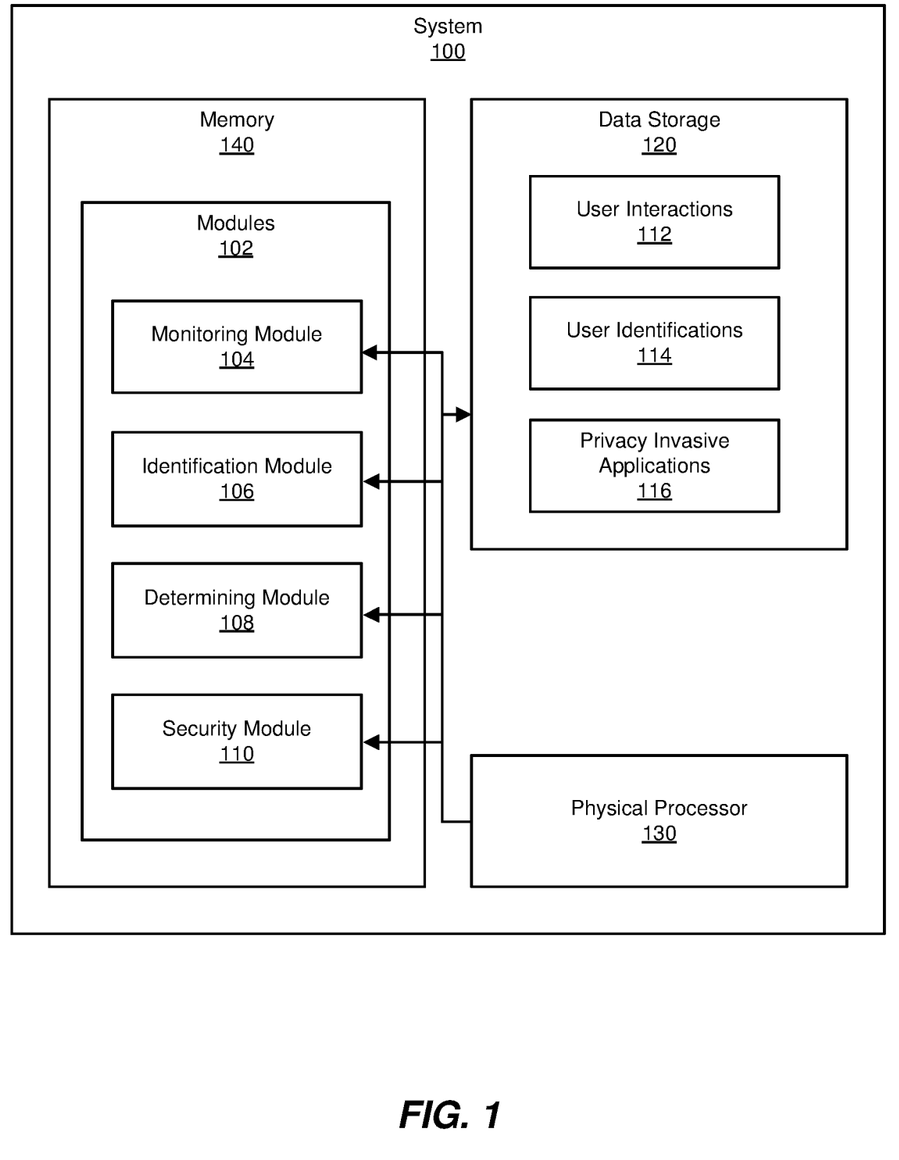
FIG. 1 is a block diagram of an example system for utilizing user identity notifications to protect against potential privacy attacks on mobile devices.
Figure 2:
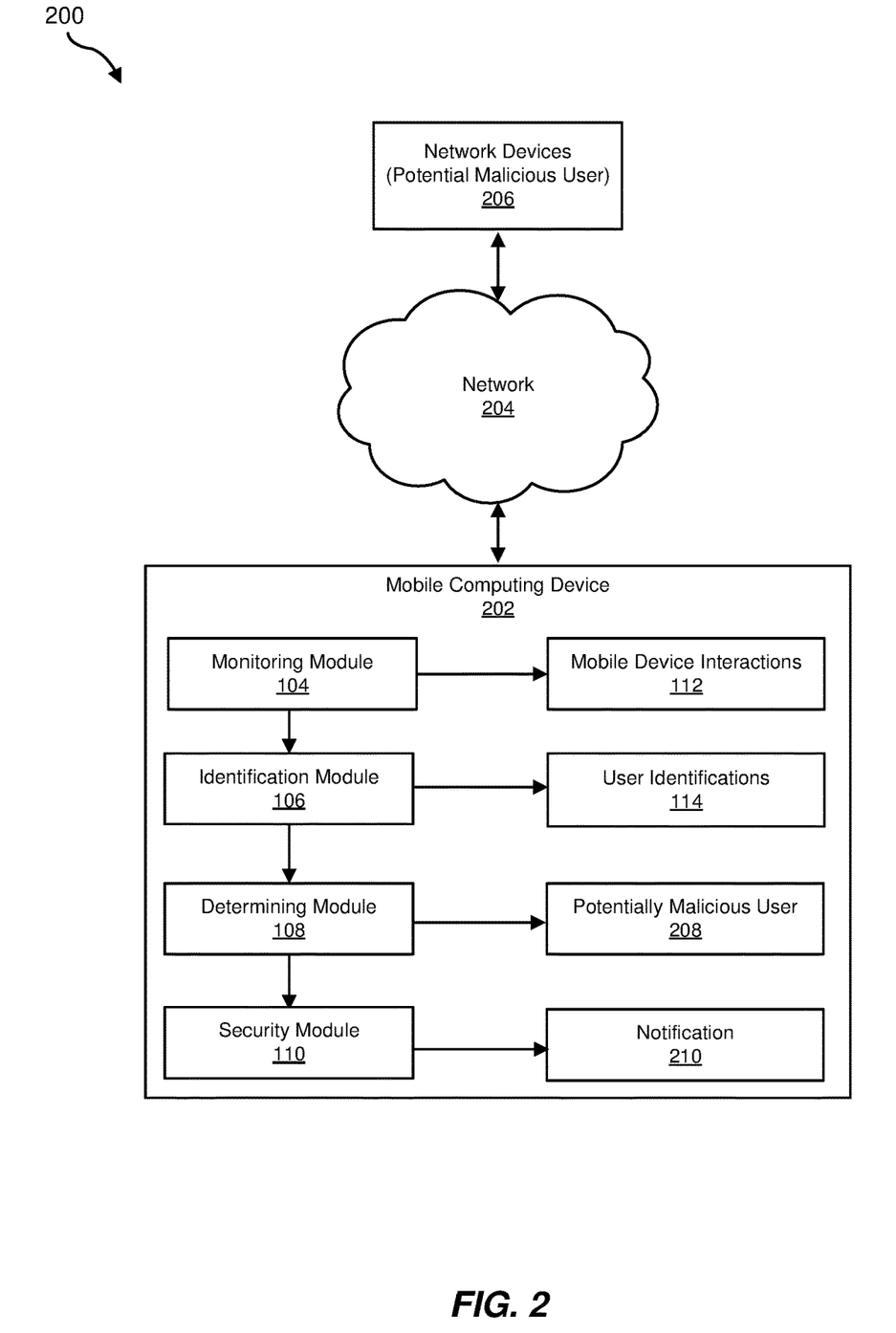
FIG. 2 is a block diagram of an additional example system for utilizing user identity notifications to protect against potential privacy attacks on mobile devices.

The following will provide, with reference to FIGS. 1-2, detailed descriptions of example systems for utilizing user identity notifications to protect against potential privacy attacks on mobile devices. Detailed descriptions of corresponding computer-implemented methods will also be provided in connection with FIGS. 3-4. In addition, a detailed description of an example mobile device application screen display showing a notification of a potential privacy attack, will also be provided in connection with FIG. 5. In addition, detailed descriptions of an example computing system and network architecture capable of implementing one or more of the embodiments described herein will be provided in connection with FIGS. 6 and 7, respectively.

FIG. 1 is a block diagram of an example system 100 for utilizing user identity notifications to protect against potential privacy attacks on mobile devices. As illustrated in this figure, example system 100 may include one or more modules 102 for performing one or more tasks. For example, and as will be explained in greater detail below, example system 100 may include a monitoring module 104 that monitors a mobile computing device to detect one or more user interactions 112. Example system 100 may additionally include an identification module 106 that identifies a current user (e.g., by generating a user identification 114) of the mobile computing device. Example system 100 may also include a determining module 108 to determine that the current user is a potentially malicious user associated with one or more privacy-invasive applications 116 installed on the mobile computing device. Example system 100 may additionally include a security module 110 that performs a security action that protects a benign user of the mobile computing device against an attack initiated by the potentially malicious user associated with privacy-invasive applications 116.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent modules stored and configured to run on one or more computing devices, such as the devices illustrated in FIG. 2 (e.g., mobile computing device 202). One or more of modules 102 in FIG. 1 may also represent all or portions of one or more special-purpose computers configured to perform one or more tasks.

As illustrated in FIG. 1, example system 100 may also include one or more memory devices, such as memory 140. Memory 140 generally represents any type or form of volatile or non-volatile storage device or medium capable of storing data and/or computer-readable instructions. In one example, memory 140 may store, load, and/or maintain one or more of modules 102. Examples of memory 140 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, and/or any other suitable storage memory.

As illustrated in FIG. 1, example system 100 may also include one or more physical processors, such as physical processor 130. Physical processor 130 generally represents any type or form of hardware-implemented processing unit capable of interpreting and/or executing computer-readable instructions. In one example, physical processor 130 may access and/or modify one or more of modules 102 stored in memory 140. Additionally or alternatively, physical processor 130 may execute one or more of modules 102 to facilitate utilizing user identity notifications to protect against potential privacy attacks on mobile devices. Examples of physical processor 130 include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, and/or any other suitable physical processor.

As illustrated in FIG. 1, example system 100 may also include a data storage 120 for storing data. In one example, data storage 120 may store data representing user interactions 112 and user identifications 114. Data storage may also store a record (e.g., a list) of privacy-invasive applications 116 installed on a mobile computing device.

Example system 100 in FIG. 1 may be implemented in a variety of ways. For example, all or a portion of example system 100 may represent portions of example system 200 in FIG. 2. As shown in FIG. 2, system 200 may include a mobile computing device 202 in communication with one or more network devices 206 via a network 204. In one example, all or a portion of the functionality of modules 102 may be performed by mobile computing device 202, network devices 206, and/or any other suitable computing system. As will be described in greater detail below, one or more of modules 102 from FIG. 1 may, when executed by at least one processor of mobile computing device 202, enable mobile computing device 202 to utilize user identity notifications to protect against potential privacy attacks.

For example, monitoring module 104 may detect one or more user interactions 112 (e.g., installing a privacy-invasive application or configuring a previously installed application with privacy-invasive features) by a current user of mobile computing device 202. Next, identification module 106 may identify a current user of mobile computing device 202. Then, determining module 108 may determine that the current user is a potentially malicious user 208 associated with one or more privacy-invasive applications 116 installed on mobile computing device 202. Finally, security module 110 may perform a security action that protects a benign user of mobile computing device 202 against an attack initiated by a potentially malicious user associated with privacy-invasive applications 116.

Mobile computing device 202 generally represents any type or form of computing device capable of reading computer-executable instructions. In some examples, mobile computing device 202 may be an endpoint device running client-side security software for monitoring and remediating various threats caused by malicious mobile applications. Additional examples of mobile computing device 202 include, without limitation, laptops, tablets, cellular phones, Personal Digital Assistants (PDAs), multimedia players, embedded systems, wearable devices (e.g., smart watches, smart glasses, etc.), smart vehicles, smart packaging (e.g., active or intelligent packaging), gaming consoles, so-called Internet-of-Things devices (e.g., smart appliances, etc.), variations or combinations of one or more of the same, and/or any other suitable computing device.

Network devices 206 generally represents any type or form of computing device that is capable of reading computer-executable instructions. In some examples, network devices 206 may be a group of endpoint devices associated with a potentially malicious user having access to mobile computing device 202 for installing privacy-invasive applications and/or privacy-invasive features of previously installed privacy-invasive applications. Additional examples of network devices 206 include, without limitation, laptops, tablets, cellular phones, Personal Digital Assistants (PDAs), multimedia players, embedded systems, wearable devices (e.g., smart watches, smart glasses, etc.), smart vehicles, smart packaging (e.g., active or intelligent packaging), gaming consoles, so-called Internet-of-Things devices (e.g., smart appliances, etc.), variations or combinations of one or more of the same, and/or any other suitable computing device.

Network 204 generally represents any medium or architecture capable of facilitating communication or data transfer. In one example, network 204 may facilitate communication between mobile computing device 202 and network devices 206. In this example, network 204 may facilitate communication or data transfer using wireless and/or wired connections. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), portions of one or more of the same, variations or combinations of one or more of the same, and/or any other suitable network.

Figure 3:
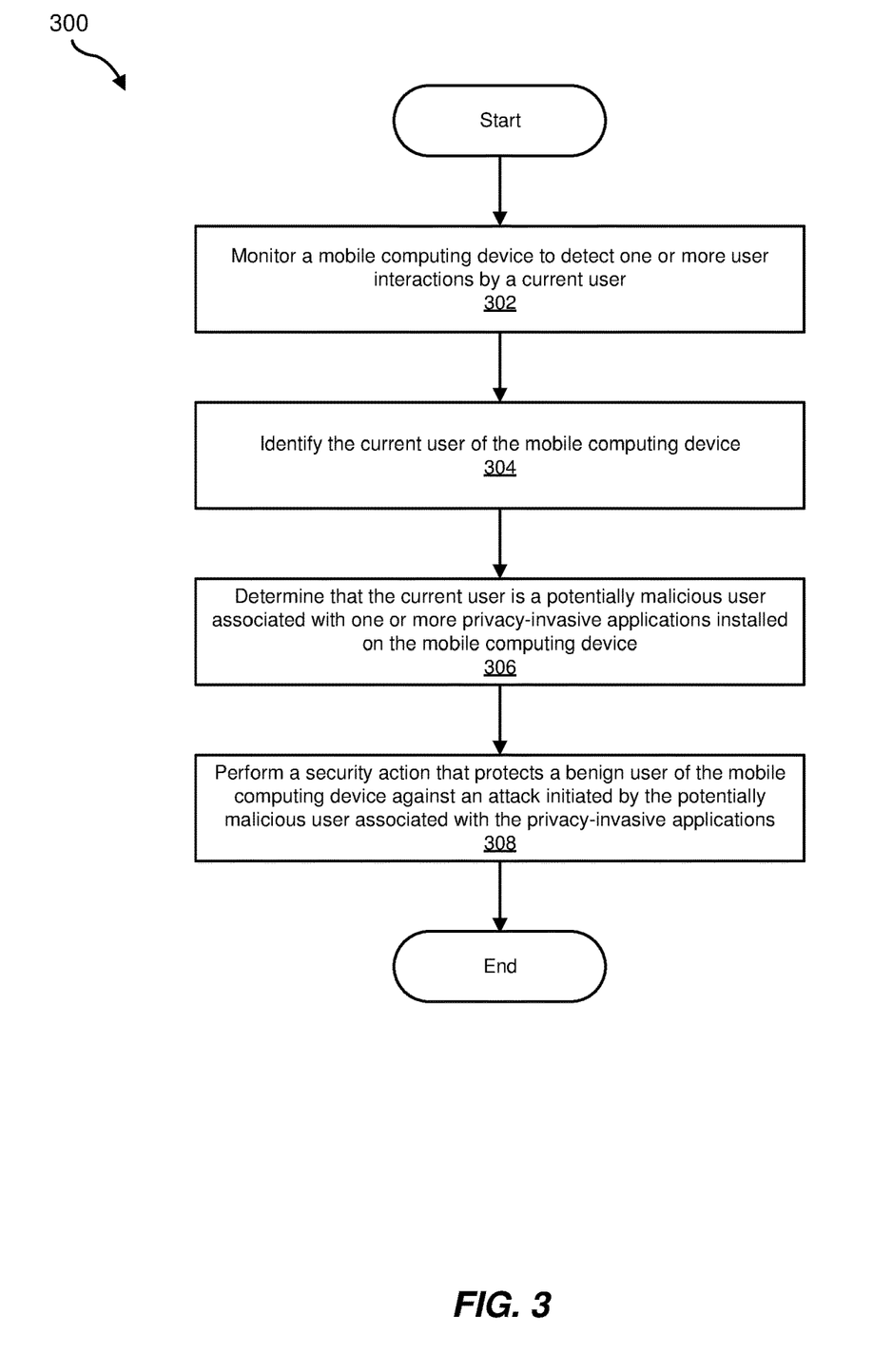
FIG. 3 is a flow diagram of an example method for utilizing user identity notifications to protect against potential privacy attacks on mobile devices.

FIG. 3 is a flow diagram of an example computer-implemented method 300 for utilizing user identity notifications to protect against potential privacy attacks on mobile devices. The steps shown in FIG. 3 may be performed by any suitable computer-executable code and/or computing system, including system 100 in FIG. 1, system 200 in FIG. 2, and/or variations or combinations of one or more of the same. In one example, each of the steps shown in FIG. 3 may represent an algorithm whose structure includes and/or is represented by multiple sub-steps, examples of which will be provided in greater detail below.

As illustrated in FIG. 3, at step 302 one or more of the systems described herein may monitor a mobile computing device to detect one or more user interactions by a current user. For example, monitoring module 104 may, as part of mobile computing device 202 in FIG. 2, monitor mobile computing device 202 for one or more user interactions 112.

The term "user interactions," as used herein, generally refers to any user input (e.g., touch input, voice input, etc.) for navigating and/or interacting with a mobile device application (including a mobile device operating system) running on a mobile computing device. In some examples, user interactions may include user inputs for authenticating a user on a mobile computing device. In other examples, user interactions may include user inputs for installing a mobile device application (via a mobile device installation application) on mobile computing device. In additional examples, user interactions may include user inputs for configuring (via a mobile device operating system) a previously installed mobile application to add additional features (e.g., privacy-invasive features).

Monitoring module 104 may detect user interactions 112 in a variety of ways. In some embodiments, monitoring module 104 may monitor mobile computing device 202 at periodic intervals (e.g., every 60 seconds) for any received user inputs. Additionally or alternatively, monitoring module 104 may detect whenever an authentication is attempted to mobile computing device 202 by a current user. Additionally or alternatively, monitoring module 104 may detect a mobile application installation action during use of mobile computing device 202 by a current user.

At step 304, one or more of the systems described herein may identify a current user of mobile computing device 202. For example, identification module 106 may, as part of mobile computing device 202 in FIG. 2, identify a user who is currently performing one or more user interactions 112 (i.e., the current user) as a user identification 114 on mobile computing device 202.

Identification module 106 may identify the current user of mobile computing device 202 in a variety of ways. In some embodiments, identification module 106 may capture a self-portrait image (e.g., a "selfie") of the current user as a user identification 114 and apply a facial recognition algorithm to the captured self-portrait image during a periodic monitoring interval or during a user interaction 112 (e.g., whenever mobile computing device 202 authenticates a user or whenever a user initiates an application installation action on mobile computing device 202). Additionally or alternatively, identification module 106 may detect a biometric pattern of the current user as a user identification 114 during a user interaction 112 (e.g., whenever mobile computing device 202 authenticates a user or whenever a user initiates an application installation action on mobile computing device 202). Additionally or alternatively, identification module 106 may detect a passcode associated with the current user as a user identification 114 during a user interaction 112 (e.g., whenever mobile computing device 202 authenticates a user or whenever a user initiates an application installation action on mobile computing device 202). In some examples, the biometric pattern and the passcode (along with corresponding user identification information) may be stored by a mobile operating system accessibility service on mobile computing device 202 or, alternatively, by a mobile device cloud backup service, based on a previous use of mobile computing device 202.

At step 306, one or more of the systems described herein may determine that the current user is a potentially malicious user associated with one or more privacy-invasive applications installed on the mobile computing device. For example, determining module 108 may, as part of mobile computing device 202 in FIG. 2, determine that the current user is potentially malicious user 208 associated with a privacy-invasive application 116.

Determining module 108 may determine that the current user of mobile computing device 202 is potentially malicious user 208 in a variety of ways. In some embodiments, determining module 108 may monitor the current user's usage of mobile computing device 202 to detect an installation of a surveillance application (e.g., stalkerware, etc.). Additionally or alternatively, determining module 108 may monitor the current user's usage of mobile computing device 202 to detect utilization of a previously installed application having configurable privacy-invasive features. For example, a mapping application may be configured to share the location of a mobile computing device owner or other benign user who is not the current user of mobile computing device 202. As another example, a browser application may be configured to share the browsing history, bookmarks, and passwords (e.g., during browser synchronization operations) of a mobile computing device owner or other benign user who is not the current user of mobile computing device 202.

At step 308, one or more of the systems described herein may perform a security action that protects a benign user of the mobile computing device against an attack initiated by the potentially malicious user associated with the privacy-invasive applications. For example, security module 110 may, as part of mobile computing device 202 in FIG. 2, perform a security action that protects a benign user of mobile computing device 202 against an attack initiated by potentially malicious user 208 associated with privacy-invasive applications 116.

Security module 110 may perform the security action in a variety of ways. In some embodiments, and as will be described in greater detail below with respect to FIG. 4, security module 110 may be configured to generate a notification 210 including an identification of potentially malicious user 208 as well as an identification of any privacy-invasive applications 116 installed on and/or utilized on mobile computing device 202 for delivery to a benign user. In some examples, a benign user may be an owner or primary user of mobile computing device 202 (whose identity may be stored as owner information data by a settings application on mobile computing device 202). In other examples, a benign user may be a guest user of mobile computing device 202 who has been determined (e.g., by determining module 108) to not be associated with the installation of a privacy-invasive application 116 or the use of privacy-invasive features of other applications while using mobile computing device 202. In some embodiments, when the benign user is an owner or primary user of mobile computing device 202, determining module 108 may determine that this user is not a potentially malicious user even if the owner or primary user has installed a privacy-invasive application or utilized application privacy-invasive features as these uses of mobile computing device 202 may be presumed to be for legitimate purposes (e.g., the device owner installs a location tracking application to assist in finding a lost device or activates a tracking feature in a mapping application to identify a current location for obtaining driving directions). In some examples, security module 110 may be configured to generate notification 210 each time a new user of mobile computing device 202 is detected, following the most recent installation of a privacy-invasive application 116. Additionally or alternatively, security module 110 may be configured to generate notification 210 to all benign users of mobile computing device 202 and further be configured to re-issue or store any previously issued notifications for review.

Figure 4:
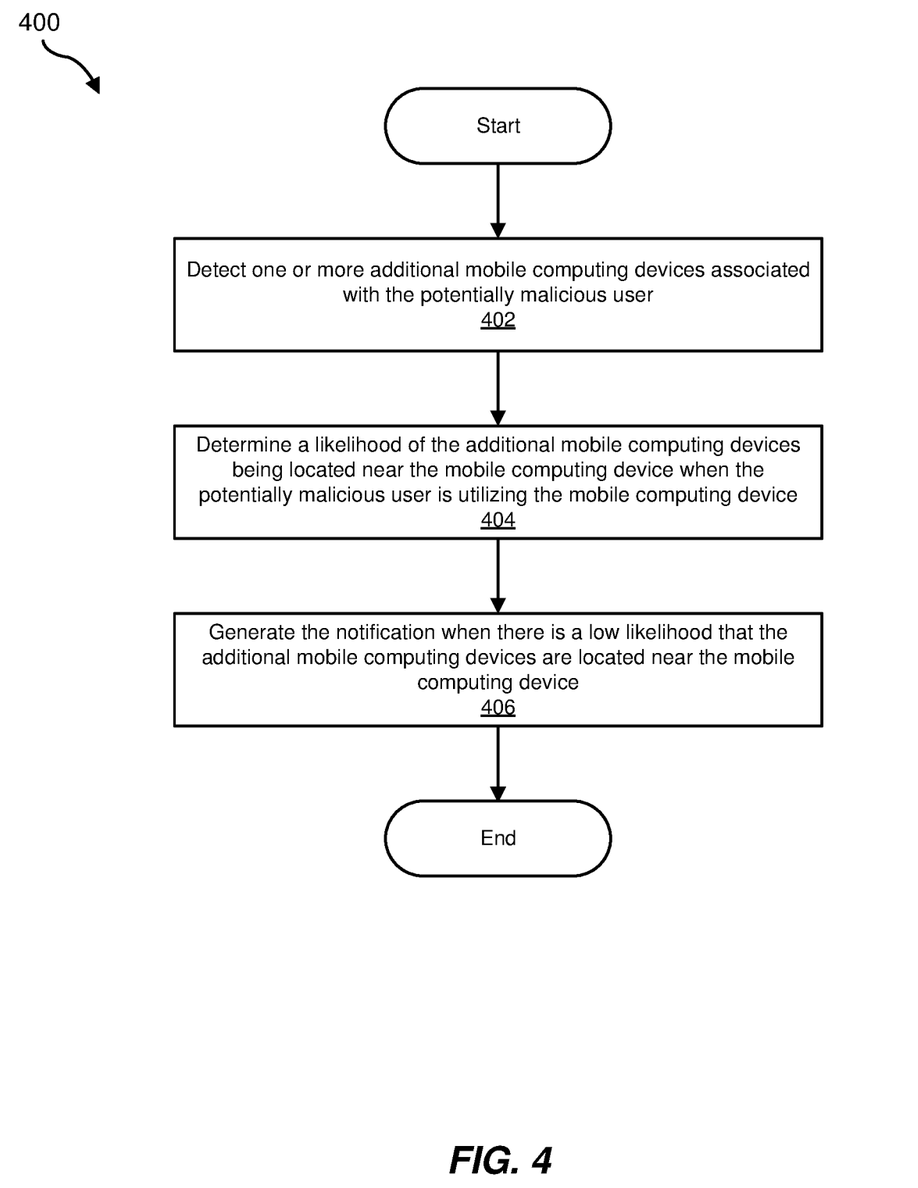
FIG. 4 is a flow diagram of an additional example method for utilizing user identity notifications to protect against potential privacy attacks on mobile devices.

Turning now to FIG. 4, a flow diagram of an example computer-implemented method 400 for utilizing user identity notifications to protect against potential privacy attacks on mobile devices will now be described. The steps shown in FIG. 4 may be performed by any suitable computer-executable code and/or computing system, including system 100 in FIG. 1, system 200 in FIG. 2, and/or variations or combinations of one or more of the same. In one example, each of the steps shown in FIG. 4 may represent an algorithm whose structure includes and/or is represented by multiple sub-steps, examples of which will be provided in greater detail below.

As illustrated in FIG. 4, at step 402 one or more of the systems described herein may detect one or more additional mobile computing devices associated with the potentially malicious user determined at step 306 in FIG. 3. For example, security module 110 may, as part of mobile computing device 202 in FIG. 2, detect network devices 206 associated with potentially malicious user 208.

Security module 110 may detect network devices 206 in a variety of ways. In some embodiments, network devices 206 may be detected by monitoring wireless signals of nearby computing devices during usage of mobile computing device 202 by potentially malicious user 208.

At step 404, one or more of the systems described herein may determine a likelihood of the additional mobile computing devices being located near the mobile computing device when the potentially malicious user is utilizing the mobile computing device. For example, security module 110 may, as part of mobile computing device 202 in FIG. 2, determine a likelihood of network devices 206 being located near mobile computing device 202 when potentially malicious user 208 is utilizing mobile computing device 202.

Security module 110 may determine the likelihood of network devices 206 being located near mobile computing device 202 when potentially malicious user 208 is utilizing mobile computing device 202, in a variety of ways. In some examples, security module 110 may be configured, during usage of mobile computing device 202 by potentially malicious user 208, to profile other nearby mobile devices and identify the mobile devices most likely to be nearby when potentially malicious user 208 is using mobile computing device 202 associated with privacy-invasive applications 116.

At step 406, one or more of the systems described herein may generate the notification when there is a low likelihood that the additional mobile computing devices are located near the mobile computing device. For example, security module 110, as part of mobile computing device 202 in FIG. 2, may only generate notification 210 when there is a low likelihood that network devices 206, associated with potentially malicious user 208, are located near mobile computing device 202. As a result, security module 110 may only generate notification 210 when potentially malicious user 208 is not nearby and (presumably) when potentially user 208 has not recently used mobile computing device 202.

Figure 5:
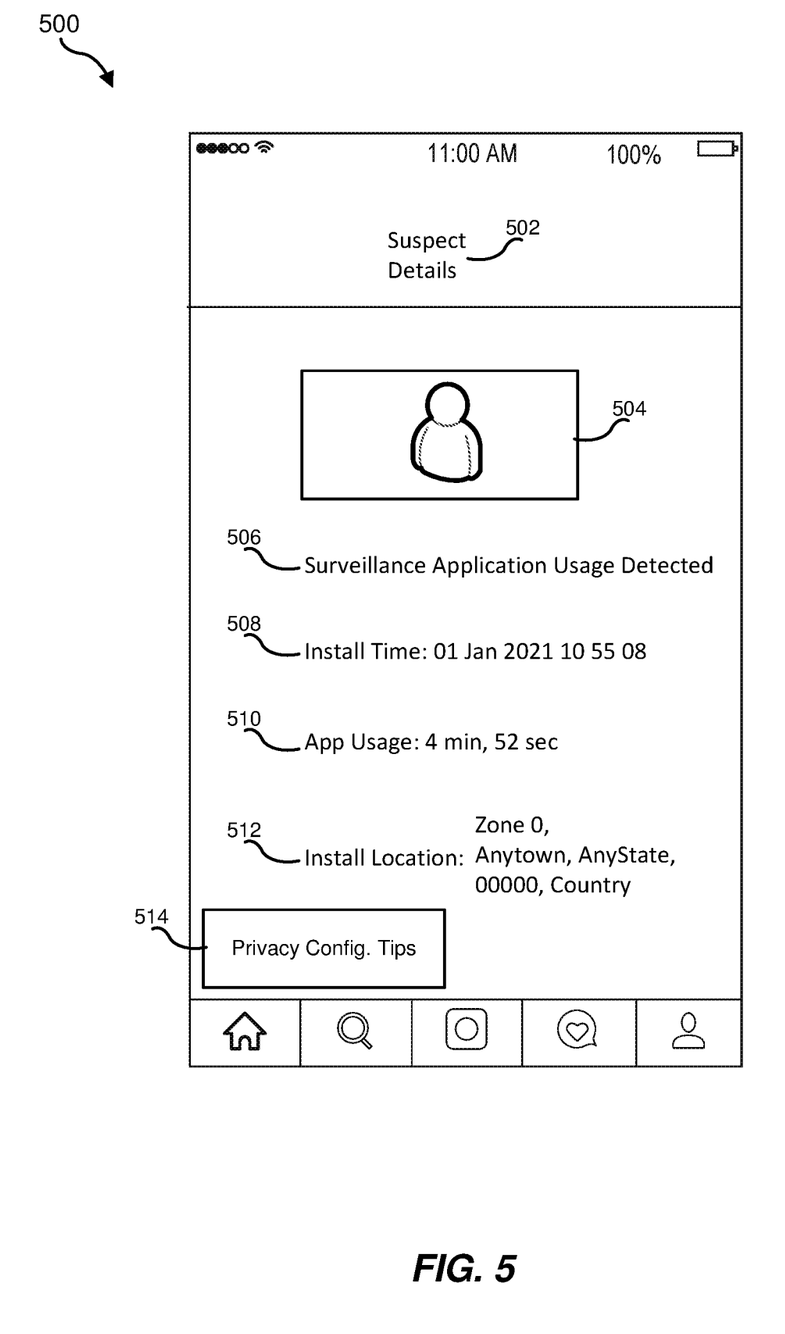
FIG. 5 is a block diagram of an example mobile device application screen display showing a notification of a potential privacy attack on a mobile device.

FIG. 5 is a block diagram of an example mobile device screen display 500 showing a notification of a potential privacy attack on a mobile device. The example mobile device screen display 500 may include a notification 502 for a potentially malicious user associated with a potential privacy attack on a mobile device. The example mobile device screen display 500 may further include a user identification 504 (e.g., a "selfie") of the potentially malicious user determined utilizing a facial recognition algorithm. In some examples, a device owner or other benign mobile device user may be requested by a security application generating the notification, to assist in identifying the potentially malicious user shown in the selfie.

The example mobile device screen display 500 may further include an application category (e.g., a surveillance application usage detected notification 506) associated with a privacy-invasive application, an application installation time 508, an application usage duration 510, and an application installation location 512, associated with the use of a privacy-invasive application by the potentially malicious user. In some examples, example mobile device screen display 500 may further include an option for displaying privacy configuration tips 514 to a benign user. In some examples, privacy configuration tips 514 may include general advice on privacy-focused device configuration tips to protect against additional privacy attacks such as, for example, creating a mobile device backup so that a mobile computing device may then scan for all privacy-invasive applications installed on the mobile computing device.

As explained in connection with method 300 above, the systems and methods described herein provide for utilizing user identity notifications to protect against potential privacy attacks on mobile devices by leveraging various mobile device detection features (e.g., capturing self-portrait images or "selfies" and applying a facial recognition algorithm to the captured selfie, capturing biometric patterns, etc.) to identify potentially malicious users of privacy-invasive applications (e.g., surveillance applications using location tracking with access to a device's browsing history, "stalkerware," etc.) and further monitor the usage of these applications. By utilizing mobile device detection features in this way, the systems and methods described herein may protect the privacy of benign mobile device users (e.g., a mobile device owner or other primary mobile device user) who may intentionally or unintentionally share their mobile devices with third parties, by generating and delivering notifications to these users that include the identity of a potential malicious user utilizing and/or installing privacy-invasive applications as well as providing a description of the type of surveillance conducted through these applications. Thus, the systems and method described herein provide an advantage over existing notification mechanisms for privacy invasive applications utilized by conventional security software, which are often limited to only delivering notifications of these applications on a periodic basis without identifying a potentially malicious user. In addition, the systems and methods described herein may improve the field of computing device security by identifying potentially malicious parties utilizing mobile computing devices to surveil benign mobile device users through the use of privacy-invasive applications on their devices, and further, notifying these benign users of these privacy intrusions.

Figure 6:
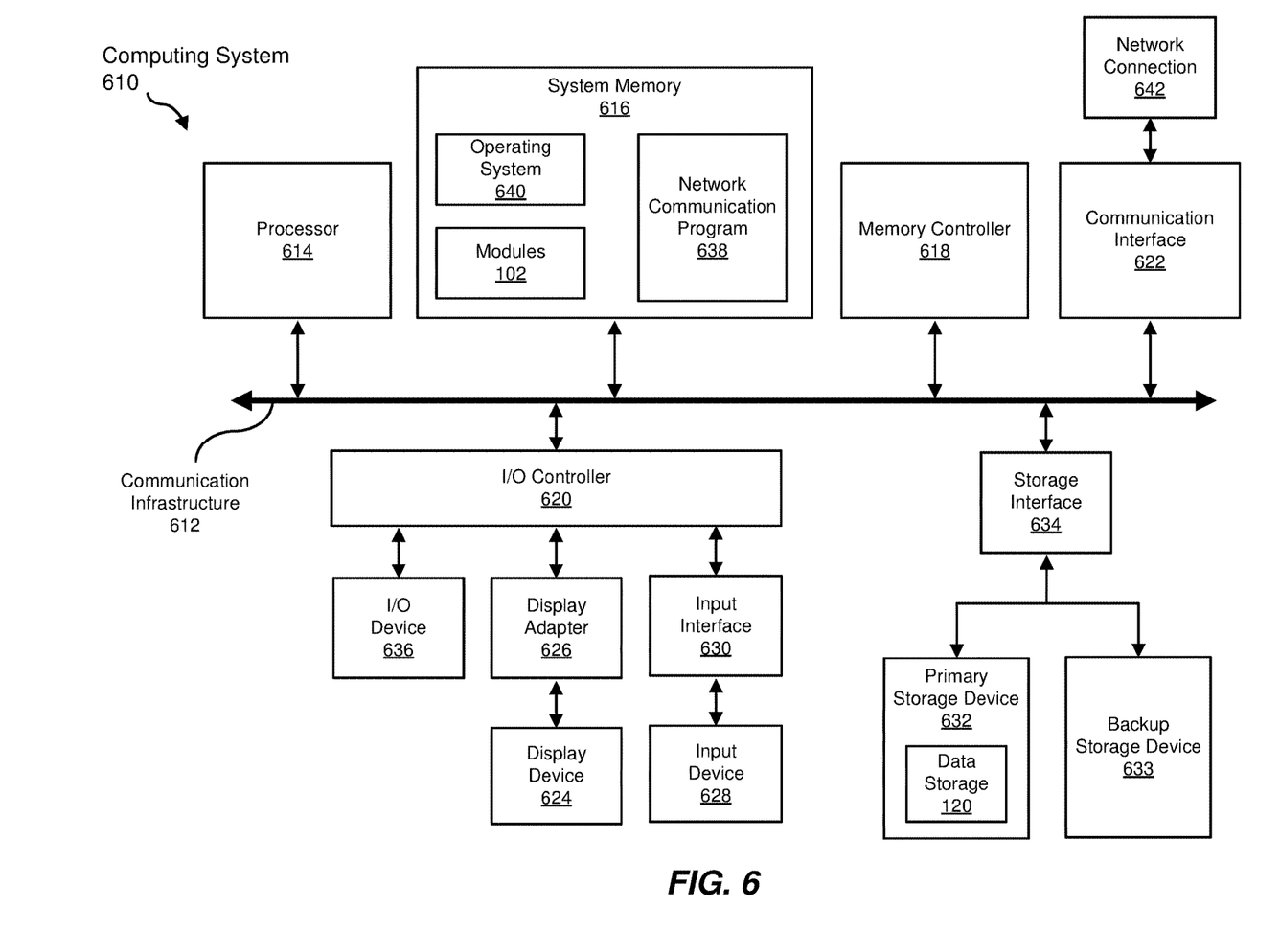
FIG. 6 is a block diagram of an example computing system capable of implementing one or more of the embodiments described and/or illustrated herein.

FIG. 6 is a block diagram of an example computing system 610 capable of implementing one or more of the embodiments described and/or illustrated herein. For example, all or a portion of computing system 610 may perform and/or be a means for performing, either alone or in combination with other elements, one or more of the steps described herein (such as one or more of the steps illustrated in FIG. 3). All or a portion of computing system 610 may also perform and/or be a means for performing any other steps, methods, or processes described and/or illustrated herein.

Computing system 610 broadly represents any single or multi-processor computing device or system capable of executing computer-readable instructions. Examples of computing system 610 include, without limitation, workstations, laptops, client-side terminals, servers, distributed computing systems, handheld devices, or any other computing system or device. In its most basic configuration, computing system 610 may include at least one processor 614 and a system memory 616.

Processor 614 generally represents any type or form of physical processing unit (e.g., a hardware-implemented central processing unit) capable of processing data or interpreting and executing instructions. In certain embodiments, processor 614 may receive instructions from a software application or module. These instructions may cause processor 614 to perform the functions of one or more of the example embodiments described and/or illustrated herein.

System memory 616 generally represents any type or form of volatile or non-volatile storage device or medium capable of storing data and/or other computer-readable instructions. Examples of system memory 616 include, without limitation, Random Access Memory (RAM), Read Only Memory (ROM), flash memory, or any other suitable memory device. Although not required, in certain embodiments computing system 610 may include both a volatile memory unit (such as, for example, system memory 616) and a non-volatile storage device (such as, for example, primary storage device 632, as described in detail below). In one example, one or more of modules 102 from FIG. 1 may be loaded into system memory 616.

In some examples, system memory 616 may store and/or load an operating system 640 for execution by processor 614. In one example, operating system 640 may include and/or represent software that manages computer hardware and software resources and/or provides common services to computer programs and/or applications on computing system 610. Examples of operating system 640 include, without limitation, LINUX, JUNOS, MICROSOFT WINDOWS, WINDOWS MOBILE, MAC OS, APPLE'S 10S, UNIX, GOOGLE CHROME OS, GOOGLE'S ANDROID, SOLARIS, variations of one or more of the same, and/or any other suitable operating system.

In certain embodiments, example computing system 610 may also include one or more components or elements in addition to processor 614 and system memory 616. For example, as illustrated in FIG. 6, computing system 610 may include a memory controller 618, an Input/Output (I/O) controller 620, and a communication interface 622, each of which may be interconnected via a communication infrastructure 612. Communication infrastructure 612 generally represents any type or form of infrastructure capable of facilitating communication between one or more components of a computing device. Examples of communication infrastructure 612 include, without limitation, a communication bus (such as an Industry Standard Architecture (ISA), Peripheral Component Interconnect (PCI), PCI Express (PCIe), or similar bus) and a network.

Memory controller 618 generally represents any type or form of device capable of handling memory or data or controlling communication between one or more components of computing system 610. For example, in certain embodiments memory controller 618 may control communication between processor 614, system memory 616, and I/O controller 620 via communication infrastructure 612.

I/O controller 620 generally represents any type or form of module capable of coordinating and/or controlling the input and output functions of a computing device. For example, in certain embodiments I/O controller 620 may control or facilitate transfer of data between one or more elements of computing system 610, such as processor 614, system memory 616, communication interface 622, display adapter 626, input interface 630, and storage interface 634.

As illustrated in FIG. 6, computing system 610 may also include at least one display device 624 coupled to I/O controller 620 via a display adapter 626. Display device 624 generally represents any type or form of device capable of visually displaying information forwarded by display adapter 626. Similarly, display adapter 626 generally represents any type or form of device configured to forward graphics, text, and other data from communication infrastructure 612 (or from a frame buffer, as known in the art) for display on display device 624.

As illustrated in FIG. 6, example computing system 610 may also include at least one input device 628 coupled to I/O controller 620 via an input interface 630. Input device 628 generally represents any type or form of input device capable of providing input, either computer or human generated, to example computing system 610. Examples of input device 628 include, without limitation, a keyboard, a pointing device, a speech recognition device, variations or combinations of one or more of the same, and/or any other input device.

Additionally or alternatively, example computing system 610 may include additional I/O devices. For example, example computing system 610 may include I/O device 636. In this example, I/O device 636 may include and/or represent a user interface that facilitates human interaction with computing system 610. Examples of I/O device 636 include, without limitation, a computer mouse, a keyboard, a monitor, a printer, a modem, a camera, a scanner, a microphone, a touchscreen device, variations or combinations of one or more of the same, and/or any other I/O device.

Communication interface 622 broadly represents any type or form of communication device or adapter capable of facilitating communication between example computing system 610 and one or more additional devices. For example, in certain embodiments communication interface 622 may facilitate communication between computing system 610 and a private or public network including additional computing systems. Examples of communication interface 622 include, without limitation, a wired network interface (such as a network interface card), a wireless network interface (such as a wireless network interface card), a modem, and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a telephone or cable network, a cellular telephone connection, a satellite data connection, or any other suitable connection.

In certain embodiments, communication interface 622 may also represent a host adapter configured to facilitate communication between computing system 610 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 622 may also allow computing system 610 to engage in distributed or remote computing. For example, communication interface 622 may receive instructions from a remote device or send instructions to a remote device for execution.

In some examples, system memory 616 may store and/or load a network communication program 638 for execution by processor 614. In one example, network communication program 638 may include and/or represent software that enables computing system 610 to establish a network connection 642 with another computing system (not illustrated in FIG. 6) and/or communicate with the other computing system by way of communication interface 622. In this example, network communication program 638 may direct the flow of outgoing traffic that is sent to the other computing system via network connection 642. Additionally or alternatively, network communication program 638 may direct the processing of incoming traffic that is received from the other computing system via network connection 642 in connection with processor 614.

Although not illustrated in this way in FIG. 6, network communication program 638 may alternatively be stored and/or loaded in communication interface 622. For example, network communication program 638 may include and/or represent at least a portion of software and/or firmware that is executed by a processor and/or Application Specific Integrated Circuit (ASIC) incorporated in communication interface 622.

As illustrated in FIG. 6, example computing system 610 may also include a primary storage device 632 and a backup storage device 633 coupled to communication infrastructure 612 via a storage interface 634. Storage devices 632 and 633 generally represent any type or form of storage device or medium capable of storing data and/or other computer-readable instructions. For example, storage devices 632 and 633 may be a magnetic disk drive (e.g., a so-called hard drive), a solid state drive, a floppy disk drive, a magnetic tape drive, an optical disk drive, a flash drive, or the like. Storage interface 634 generally represents any type or form of interface or device for transferring data between storage devices 632 and 633 and other components of computing system 610. In one example, data storage 120] from FIG. 1 may be stored and/or loaded in primary storage device 632.

In certain embodiments, storage devices 632 and 633 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 633 may also include other similar structures or devices for allowing computer software, data, or other computer-readable instructions to be loaded into computing system 610. For example, storage devices 632 and 633 may be configured to read and write software, data, or other computer-readable information. Storage devices 632 and 633 may also be a part of computing system 610 or may be a separate device accessed through other interface systems.

Many other devices or subsystems may be connected to computing system 610. Conversely, all of the components and devices illustrated in FIG. 6 need not be present to practice the embodiments described and/or illustrated herein. The devices and subsystems referenced above may also be interconnected in different ways from that shown in FIG. 6. Computing system 610 may also employ any number of software, firmware, and/or hardware configurations. For example, one or more of the example embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 610. All or a portion of the computer program stored on the computer-readable medium may then be stored in system memory 616 and/or various portions of storage devices 632 and 633. When executed by processor 614, a computer program loaded into computing system 610 may cause processor 614 to perform and/or be a means for performing the functions of one or more of the example embodiments described and/or illustrated herein. Additionally or alternatively, one or more of the example embodiments described and/or illustrated herein may be implemented in firmware and/or hardware. For example, computing system 610 may be configured as an Application Specific Integrated Circuit (ASIC) adapted to implement one or more of the example embodiments disclosed herein.

Figure 7:
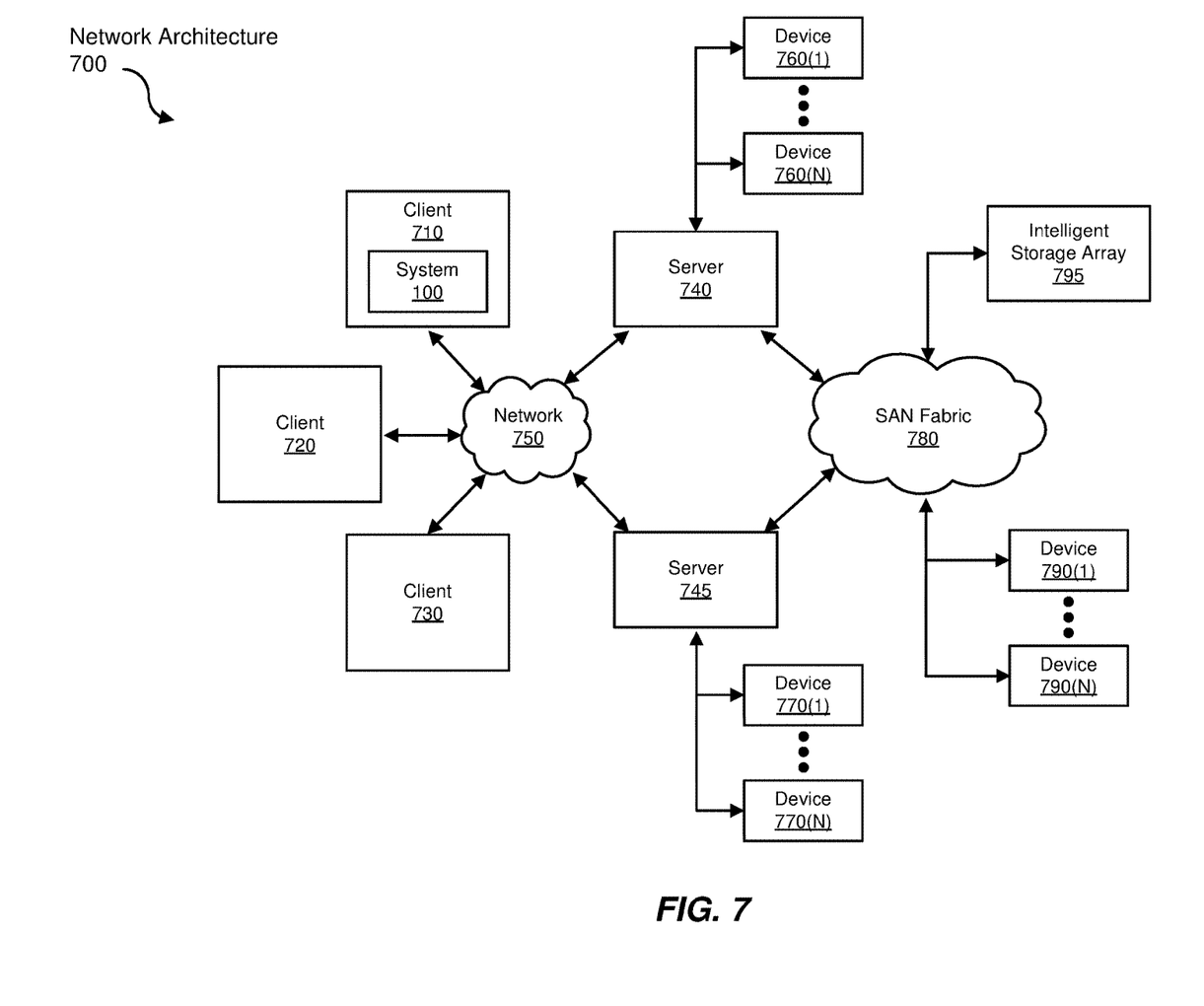
FIG. 7 is a block diagram of an example computing network capable of implementing one or more of the embodiments described and/or illustrated herein.

FIG. 7 is a block diagram of an example network architecture 700 in which client systems 710, 720, and 730 and servers 740 and 745 may be coupled to a network 750. As detailed above, all or a portion of network architecture 700 may perform and/or be a means for performing, either alone or in combination with other elements, one or more of the steps disclosed herein (such as one or more of the steps illustrated in FIG. 3). All or a portion of network architecture 700 may also be used to perform and/or be a means for performing other steps and features set forth in the present disclosure.

Client systems 710, 720, and 730 generally represent any type or form of computing device or system, such as example computing system 610 in FIG. 6. Similarly, servers 740 and 745 generally represent computing devices or systems, such as application servers or database servers, configured to provide various database services and/or run certain software applications. Network 750 generally represents any telecommunication or computer network including, for example, an intranet, a WAN, a LAN, a PAN, or the Internet. In one example, client systems 710, 720, and/or 730 and/or servers 740 and/or 745 may include all or a portion of system 100 from FIG. 1.

As illustrated in FIG. 7, one or more storage devices 760(1)-(N) may be directly attached to server 740. Similarly, one or more storage devices 770(1)-(N) may be directly attached to server 745. Storage devices 760(1)-(N) and storage devices 770(1)-(N) generally represent any type or form of storage device or medium capable of storing data and/or other computer-readable instructions. In certain embodiments, storage devices 760(1)-(N) and storage devices 770(1)-(N) may represent Network-Attached Storage (NAS) devices configured to communicate with servers 740 and 745 using various protocols, such as Network File System (NFS), Server Message Block (SMB), or Common Internet File System (CIFS).

Servers 740 and 745 may also be connected to a Storage Area Network (SAN) fabric 780. SAN fabric 780 generally represents any type or form of computer network or architecture capable of facilitating communication between a plurality of storage devices. SAN fabric 780 may facilitate communication between servers 740 and 745 and a plurality of storage devices 790(1)-(N) and/or an intelligent storage array 795. SAN fabric 780 may also facilitate, via network 750 and servers 740 and 745, communication between client systems 710, 720, and 730 and storage devices 790(1)-(N) and/or intelligent storage array 795 in such a manner that devices 790(1)-(N) and array 795 appear as locally attached devices to client systems 710, 720, and 730. As with storage devices 760(1)-(N) and storage devices 770(1)-(N), storage devices 790(1)-(N) and intelligent storage array 795 generally represent any type or form of storage device or medium capable of storing data and/or other computer-readable instructions.

In certain embodiments, and with reference to example computing system 610 of FIG. 6, a communication interface, such as communication interface 622 in FIG. 6, may be used to provide connectivity between each client system 710, 720, and 730 and network 750. Client systems 710, 720, and 730 may be able to access information on server 740 or 745 using, for example, a web browser or other client software. Such software may allow client systems 710, 720, and 730 to access data hosted by server 740, server 745, storage devices 760(1)-(N), storage devices 770(1)-(N), storage devices 790(1)-(N), or intelligent storage array 795. Although FIG. 7 depicts the use of a network (such as the Internet) for exchanging data, the embodiments described and/or illustrated herein are not limited to the Internet or any particular network-based environment.

In at least one embodiment, all or a portion of one or more of the example embodiments disclosed herein may be encoded as a computer program and loaded onto and executed by server 740, server 745, storage devices 760(1)-(N), storage devices 770(1)-(N), storage devices 790(1)-(N), intelligent storage array 795, or any combination thereof. All or a portion of one or more of the example embodiments disclosed herein may also be encoded as a computer program, stored in server 740, run by server 745, and distributed to client systems 710, 720, and 730 over network 750.

As detailed above, computing system 610 and/or one or more components of network architecture 700 may perform and/or be a means for performing, either alone or in combination with other elements, one or more steps of an example method for utilizing user identity notifications to protect against potential privacy attacks on mobile devices.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered example in nature since many other architectures can be implemented to achieve the same functionality.

In some examples, all or a portion of example system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of example system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of example system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of example system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of example system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of example system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of example system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the example embodiments disclosed herein.

In addition, one or more of the modules described herein may transform data, physical devices, and/or representations of physical devices from one form to another. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the example embodiments disclosed herein. This example description is not intended to be exhaustive or to be limited to any precise form disclosed. Many modifications and variations are possible without departing from the spirit and scope of the present disclosure. The embodiments disclosed herein should be considered in all respects illustrative and not restrictive. Reference should be made to the appended claims and their equivalents in determining the scope of the present disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for utilizing user identity notifications to protect against potential privacy attacks on mobile devices, at least a portion of the method being performed by a mobile computing device comprising at least one processor, the method comprising:

monitoring the mobile computing device to detect one or more user interactions by a current user;

identifying the current user of the mobile computing device by capturing and applying a facial recognition algorithm to a self-portrait image of the current user;

determining that the current user is a potentially malicious user associated with one or more privacy-invasive applications installed on the mobile computing device; and performing a security action that protects a benign user of the mobile computing device against an attack initiated by the potentially malicious user associated with the privacy-invasive applications, wherein performing the security action comprises generating a notification comprising an identification of the potentially malicious user and an identification of the privacy-invasive applications installed on the mobile computing device for delivery to the benign user, wherein the identification of the potentially malicious user is determined by applying the facial recognition algorithm to the captured self-portrait image of the current user, wherein the notification is generated after the potentially malicious user is determined to no longer be the current user based on a low likelihood that an additional mobile computing device associated with the potentially malicious user is near the mobile computing device.

2. The computer-implemented method of claim 1, wherein monitoring the mobile computing device to detect the user interactions by the current user comprises monitoring the mobile computing device at periodic intervals.

3. The computer-implemented method of claim 1, wherein monitoring the mobile computing device to detect the user interactions by the current user comprises detecting an authentication of the current user to the mobile computing device.

4. The computer-implemented method of claim 1, wherein monitoring the mobile computing device to detect the user interactions by the current user comprises detecting an application installation action by the current user on the mobile computing device.

5. The computer-implemented method of claim 1, wherein identifying the current user of the mobile computing device further comprises at least one of:

detecting a biometric pattern associated with the current user; or detecting a passcode associated with the current user.

6. The computer-implemented method of claim 1, wherein determining that the current user is a potentially malicious user associated with one or more privacy-invasive applications installed on the mobile computing device comprises monitoring a usage of the mobile computing device by the current user to detect one or more of:

an installation of a surveillance application on the mobile computing device; or a utilization of a previously installed application having configurable privacy invasive features on the mobile computing device.

7. The computer-implemented method of claim 1, wherein the notification further comprises a surveillance category associated with the privacy-invasive applications.

8. The computer-implemented method of claim 1, wherein the notification further comprises device configuration instructions for the mobile computing device to protect against one or more additional attacks initiated by the potentially malicious user of the privacy-invasive applications.

9. A system for utilizing user identity notifications to protect against potential privacy attacks on mobile devices, the system comprising:
- at least one physical processor;
- physical memory comprising computer-executable instructions and one or more modules that, when executed by the physical processor, cause the physical processor to:
  - monitor, by a monitoring module, a mobile computing device to detect one or more user interactions by a current user;
  - identify, by an identification module, the current user of the mobile computing device by capturing and applying a facial recognition algorithm to a self-portrait image of the current user;
  - determine, by a determining module, that the current user is a potentially malicious user associated with one or more privacy-invasive applications installed on the mobile computing device; and
  - perform, by a security module, a security action that protects a benign user of the mobile computing device against an attack initiated by the potentially malicious user associated with the privacy-invasive applications, wherein the security module performs the security action by generating a notification comprising an identification of the potentially malicious user and an identification of the privacy-invasive applications installed on the mobile computing device for delivery to the benign user, wherein the identification of the potentially malicious user is determined by applying the facial recognition algorithm to the captured self-portrait image of the current user, wherein the notification is generated after the potentially malicious user is determined to no longer be the current user based on a low likelihood that an additional mobile computing device associated with the potentially malicious user is near the mobile computing device.

10. The system of claim 9, wherein the monitoring module monitors the mobile computing device to detect the user interactions by the current user by monitoring the mobile computing device at periodic intervals.

11. The system of claim 9, wherein the monitoring module monitors the mobile computing device to detect the user interactions by the current user by detecting an authentication of the current user to the mobile computing device.

12. The system of claim 9, wherein the monitoring module monitors the mobile computing device to detect the user interactions by the current user by detecting an application installation action by the current user on the mobile computing device.

13. The system of claim 9, wherein the identification module further identifies the current user of the mobile computing device by at least one of:
- detecting a biometric pattern associated with the current user; or
- detecting a passcode associated with the current user.

14. The system of claim 9, wherein the determining module determines that the current user is a potentially malicious user associated with one or more privacy-invasive applications installed on the mobile computing device by monitoring a usage of the mobile computing device by the current user to detect one or more of:
- an installation of a surveillance application on the mobile computing device; or
- a utilization of a previously installed application having configurable privacy invasive features on the mobile computing device.

15. The system of claim 9, wherein the notification further comprises a surveillance category associated with the privacy-invasive applications.

16. A non-transitory computer-readable medium comprising one or more computer-executable instructions that, when executed by at least one processor of a mobile computing device, cause the mobile computing device to:
- monitor the mobile computing device to detect one or more user interactions by a current user;
- identify the current user of the mobile computing device by capturing and applying a facial recognition algorithm to a self-portrait image of the current user;
- determine that the current user is a potentially malicious user associated with one or more privacy-invasive applications installed on the mobile computing device; and
- perform a security action that protects a benign user of the mobile computing device against an attack initiated by the potentially malicious user associated with the privacy-invasive applications, wherein the security action is performed by generating a notification comprising an identification of the potentially malicious user and an identification of the privacy-invasive applications installed on the mobile computing device for delivery to the benign user, wherein the identification of the potentially malicious user is determined by applying the facial recognition algorithm to the captured self-portrait image of the current user, wherein the notification is generated after the potentially malicious user is determined to no longer be the current user based on a low likelihood that an additional mobile computing device associated with the potentially malicious user is near the mobile computing device.

17. The non-transitory computer-readable medium of claim 16, wherein the notification is generated by:
- detecting one or more additional mobile computing devices associated with the potentially malicious user;
- determining a likelihood of the additional mobile computing devices being located near the mobile computing device when the potentially malicious user is utilizing the mobile computing device; and
- generating the notification when there is a low likelihood that the additional mobile computing devices are located near the mobile computing device.

18. The non-transitory computer-readable medium of claim 16, wherein the notification further comprises a surveillance category associated with the privacy-invasive applications.

* * * * *